(12) United States Patent
Himmelhuber et al.

(10) Patent No.: US 8,256,842 B2
(45) Date of Patent: Sep. 4, 2012

(54) VEHICLE SEAT HAVING A DEVICE FOR VEHICLE SEAT OCCUPANCY DETECTION

(75) Inventors: Frank Himmelhuber, Kuemmersbruck (DE); Jens Kolb, Koenigstein (DE)

(73) Assignee: Grammer AG, Amberg (DE)

( * ) Notice: Subject to any disclaimer, the term of this patent is extended or adjusted under 35 U.S.C. 154(b) by 271 days.

(21) Appl. No.: 12/429,023

(22) Filed: Apr. 23, 2009

(65) Prior Publication Data

US 2009/0267392 A1    Oct. 29, 2009

(30) Foreign Application Priority Data

Apr. 25, 2008 (DE) .......................... 10 2008 020 865

(51) Int. Cl.
*A47C 1/00* (2006.01)

(52) U.S. Cl. .......... 297/344.16; 297/344.12; 297/344.15

(58) Field of Classification Search ............... 297/217.3, 297/344.12, 344.15, 344.16; 248/550
See application file for complete search history.

(56) References Cited

U.S. PATENT DOCUMENTS

| | | | | |
|---|---|---|---|---|
| 4,198,025 A | * | 4/1980 | Lowe et al. | 248/550 |
| 4,461,444 A | * | 7/1984 | Grassl et al. | 248/550 |
| 4,589,620 A | * | 5/1986 | Sakamoto | 248/550 |
| 4,733,847 A | * | 3/1988 | Grassl | 248/550 |
| 5,058,852 A | * | 10/1991 | Meier et al. | 248/588 |
| 6,055,473 A | * | 4/2000 | Zwolinski et al. | 701/49 |
| 2003/0038221 A1 | * | 2/2003 | Fu et al. | 248/421 |
| 2005/0110243 A1 | * | 5/2005 | Meier et al. | 280/727 |
| 2009/0273484 A1 | | 11/2009 | Kolb et al. | |

FOREIGN PATENT DOCUMENTS

| | | |
|---|---|---|
| DE | 19751677 | 5/1999 |
| DE | 19826287 | 12/1999 |
| DE | 10007014 | 10/2001 |
| DE | 10239761 | 3/2004 |
| DE | 10320287 | 12/2004 |
| DE | 102004024691 | 2/2006 |
| DE | 102006017774 | 10/2007 |
| DE | 102006042673 | 3/2008 |
| EP | 1498703 | 1/2005 |

* cited by examiner

*Primary Examiner* — David Dunn
*Assistant Examiner* — Philip Gabler
(74) *Attorney, Agent, or Firm* — Lowe Graham Jones PLLC

(57) ABSTRACT

The invention relates to a vehicle seat having a device for vehicle seat occupancy detection, wherein a base frame which can be adjusted in the height direction of the vehicle seat and which is composed of at least two scissors arms which are connected to one another is arranged between a seat part of the vehicle seat and a vehicle body part, wherein the base frame can be adjusted in the height direction by means of at least one gas spring, wherein the gas spring is connected to a pressure sensor, by means of which an exceeding of a predefinable pressure threshold value can be detected upon a transition of the vehicle seat from an unoccupied state to a state occupied by a minimum weight due to a change in pressure within the gas spring which is brought about as a result of the transition.

4 Claims, 2 Drawing Sheets

VEHICLE SEAT HAVING A DEVICE FOR VEHICLE SEAT OCCUPANCY DETECTION

PRIORITY CLAIM

This application claims priority to German Application Serial No. 10 2008 020 865.5 filed Apr. 25, 2008; contents of which are hereby incorporated.

FIELD OF THE INVENTION

The invention relates to a vehicle seat having a device for vehicle seat occupancy detection and, more specifically, to a vehicle seat occupancy detection device having a base frame which can be adjusted in the height direction of the vehicle seat and which is composed of at least two scissors arms which are connected to one another, the base frame arranged between a seat part of the vehicle seat and a vehicle body part, the base frame adjustable in the height direction by means of at least one gas spring.

BACKGROUND OF THE INVENTION

Until now, seat occupancy detection methods and devices for on vehicle seats have primarily consisted of a rocker arranged below a cushion element of a seat part of the vehicle seat, with a pressure sensor arranged below said rocker. See, e.g., DE 103 20 287 A1. As soon as the rocker, which due to necessarily being integrated in the seat part has a complicated structure with regard to its shape, is pushed downwards by a movement of the cushion part or of the seat part, the pressure sensor is activated and a seat movement is detected.

However, such a device for seat occupancy detection does not make it possible, or makes it possible only to a limited extent, to distinguish between a weight acting on the seat part due to a person sitting on the seat and a weight acting on the seat part due only to an object being placed on the seat part.

Although safety-related features of the vehicle, such as for example an immobilizer or the electronic activation of an ignition system of a vehicle for starting purposes, are dependent on the detection of such a seat occupancy, in the previous devices for seat occupancy detection an occupancy need not necessarily take place by a person in order to activate these safety-related features, i.e. for example to disengage the immobilizer or to electronically activate the ignition system for a starting process.

Accordingly, there is a need for a vehicle seat having a device for vehicle seat occupancy detection which makes it possible in a simple and reliable manner to distinguish between the weight of persons sitting on the seat and objects placed on the seat.

SUMMARY OF THE INVENTION

The present invention is directed to a device for vehicle seat occupancy detection which makes it possible in a simple and reliable manner to distinguish between the weight of persons sitting on the seat and objects placed on the seat.

In a vehicle seat having a device for vehicle seat occupancy detection, in which a base frame which can be adjusted in the height direction of the vehicle seat and which is composed of at least two scissors arms which are connected to one another is arranged between a seat part of the vehicle seat and a vehicle body part, and the base frame can be adjusted in the height direction by means of at least one gas spring, the gas spring is connected to a pressure sensor by means of which an exceeding of a predefinable pressure threshold value can be detected upon a transition of the vehicle seat from an unoccupied state to a state occupied by a minimum weight due to a change in pressure within the gas spring which is brought about as a result of the transition. In this case, in an unoccupied state of the vehicle seat, a pretensioned spring pressure within the gas spring below the pressure threshold value is set by means of a supply and discharge control element.

Such a design of a vehicle seat with an integrated base frame allows the initial setting of a pretensioned spring pressure within the gas spring below the pressure threshold value, at which pressure is then applied to the gas spring as a result of a seat being occupied by the minimum weight, the pressure threshold value being set in such a way that, when the seat is occupied by the minimum weight, an exceeding of this pressure threshold value inevitably takes place and it can thus be indicated, by means of the pressure sensor which detects this exceeding of the pressure threshold value, that the seat is now occupied by at least the minimum weight. If, on the other hand, no such setting of the pretensioned spring pressure below the pressure threshold value were to take place on the gas spring, there is the risk that a higher pretensioned spring pressure, i.e. a pressure above the pressure threshold value, might still prevail in the gas spring for example due to a previous seat occupancy and therefore, when the seat is then occupied by the minimum weight, only a small pressure difference which is difficult to detect exists between the previous unoccupied state and the subsequent occupied state.

In the device for seat occupancy detection according to the present invention, due to the initial lowering of the pretensioned spring pressure within the gas spring below the pressure threshold value, an exceeding of the pressure threshold value and thus a detection of seat occupancy by the minimum weight is always possible in a reliable and simple manner, provided that the level of the pressure threshold value is set in such a way that the minimum weight always leads to an exceeding of the pressure threshold value due to the pressure built up as a result of the occupancy of the seat. To this end, the pressure threshold value is preferably in the region of the pressure exerted within the gas spring from above by the minimum weight on the vehicle seat, or should be at most this pressure. Such a setting of the pressure threshold value accordingly depends on the size of the gas spring, the pressure conditions prevailing therein in the case of different excursions, i.e. different compression and expansion states, of the vehicle seat and on the desired minimum weight definition.

In order to set the pretensioned spring pressure, the preferred embodiment of the present invention includes a detection element which is attached to at least one of the scissors arms and by means of which a current height position of the scissors arm can be detected and which is connected to a height control unit. Here, the height control unit is able, as a function of the detected height position, to activate the supply and discharge control element to supply or discharge gas to or from the gas spring, which is preferably an air spring, in order to set the pretensioned spring pressure below the pressure threshold value. Accordingly, a current scissors position of the base frame can be measured and, as a function of this current scissors position, the gas spring can be set by means of gas, in particular air, via the supply and discharge control element in such a way that the pretensioned spring pressure below the pressure threshold value is set before a seat occupancy and a measurement or detection of this seat occupancy takes place.

Advantageously, at least one pressure switch is provided which is connected to the pressure sensor and which is arranged in a control current circuit for controlling a seat occupancy detection signal. When the exceeding of the pressure threshold value is detected, therefore, the pressure switch brings about a closing process so that the control current circuit is closed and a query signal concerning the seat occupancy detection which is applied thereto can be forwarded so as to be processed within a control unit (not shown in any greater detail here) for further use. By way of example, the control unit may cause an ignition system for starting the vehicle to be activated or an immobilizer that has until then been active to be switched off only once this seat occupancy detection signal is present.

The pressure threshold value is preferably at most the downward-acting weight pressure due to the minimum weight, and the existing pretensioned spring force counteracts the weight pressure.

According to one embodiment of the invention, a time control unit is provided for setting a predefinable time duration over which the pretensioned spring pressure below the pressure threshold value must exist in order to activate the vehicle seat occupancy detection. This advantageously has the result that, in the case of a spring movement of the base frame and of the vehicle seat taking place constantly during a journey, a brief exceeding of the pressure threshold value, below which the pressure profile built up by the spring movement does not result in activation of the seat occupancy detection, should take place only if the seat is not occupied for a minimum time duration.

BRIEF DESCRIPTION OF THE DRAWINGS

Advantages and expedient features can be found in the following description in conjunction with the drawing, in which.

DETAILED DESCRIPTION OF THE PREFERRED EMBODIMENT

Figure 1:
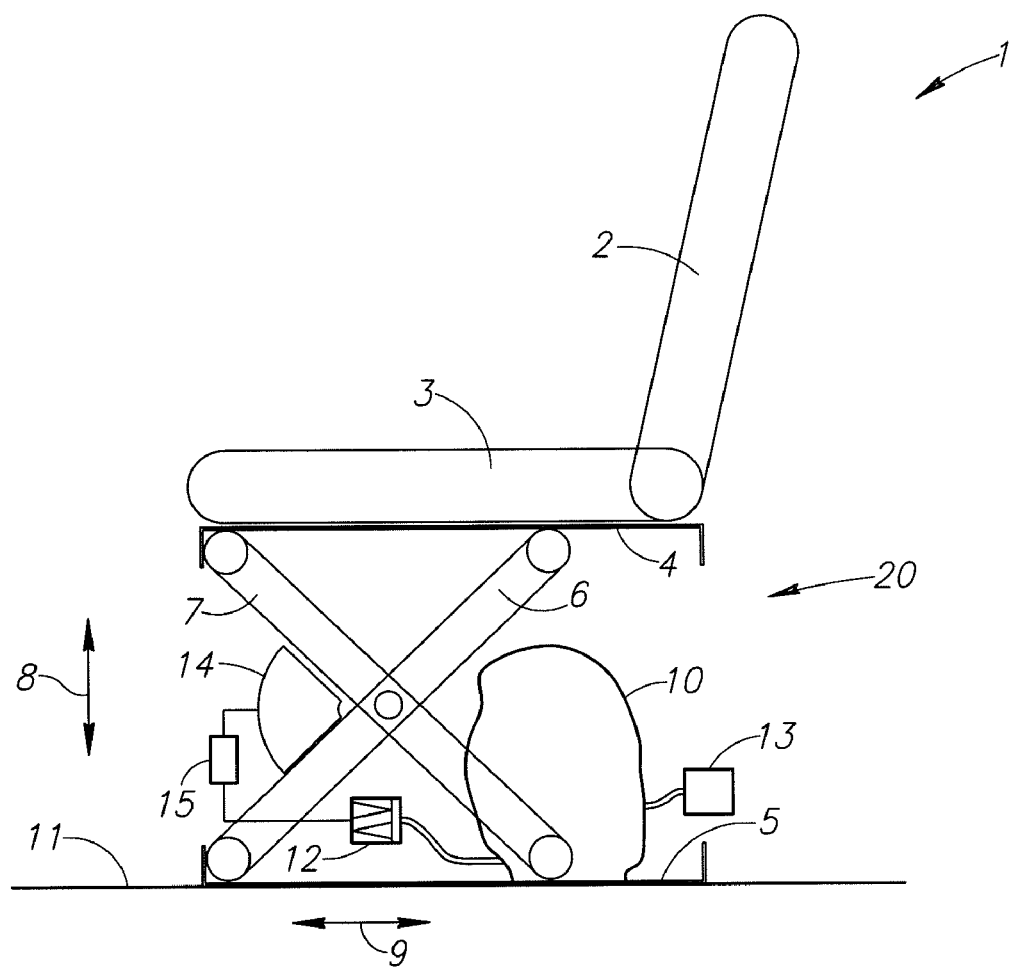
FIG. 1 shows, in a schematic side view, a vehicle seat having a device for seat occupancy detection according to one embodiment of the invention.

FIG. 1 shows, in a schematic side view, a vehicle seat having a device for seat occupancy detection according to one embodiment of the invention. The vehicle seat 1 comprises a backrest 2 and a seat part 3, wherein the seat part 3 is arranged on an upper part 4 of a base frame 20. Two scissors arms 6, 7 are arranged between the upper part 4 and a lower part 5 of the base frame 20, which scissors arms are connected to one another in an articulated manner in a central axis and can be displaced both in the height direction as shown by double arrow 8 and also in the longitudinal direction as shown by double arrow 9 on account of the articulated connection.

A gas spring, preferably an air spring 10, serves for moving the vehicle seat and thus the seat part 3 up and down under the effect of pressure.

The base frame 20 consisting of the scissors arms 6, 7 and preferably the upper part 4 and the lower part 5 is arranged between the seat part 3 and a vehicle body part 11, such as for example a floor panel of a utility vehicle cab.

By means of a supply and discharge control element 12, air is supplied to and/or discharged from the air spring 10 in a controlled manner in order to build up a desired pressure within the gas spring or air spring.

By means of a detection element 14 which is attached to at least one of the scissors arms 6, 7 and detects an excursion of the scissors arms 6, 7 in the height direction 8, for an existing height position of the scissors arms 6, 7, a signal representative of this height position is forwarded to a height control unit 15 which acts on the supply and discharge control element 12 in such a way that, as a function of the measured current height position, a pretensioned spring pressure is set within the gas spring 10 by means of the supply and discharge control element 12. The pretensioned spring pressure within the gas spring 10 is set below a pressure threshold value, which is predefinable.

As soon as a seat occupancy of the seat part 3 by a person having a minimum weight takes place, an increased pressure within the gas spring 10 is detected. In this case, the pressure profile exceeds the pressure threshold value, which is detected by a pressure sensor 13 (not shown), which may be part of the detection element 14 or other component associated with the seat occupancy detection device.

Figure 2:
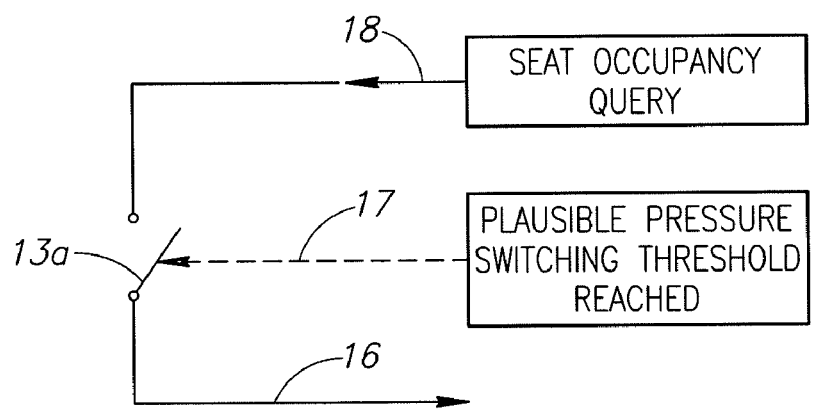
FIG. 2 shows, in a schematic detail view, a control current circuit for a device for seat occupancy detection according to the invention.

The detection of an exceeding of the pressure threshold value due to the changed pressure conditions within the gas spring on account of the seat occupancy leads to a signal being forwarded to a pressure switch 13a, as shown for example in FIG. 2.

The pressure switch 13a is arranged within a control current circuit 16, to which a query signal or a seat occupancy detection signal is applied. As soon as the control current circuit 16 is closed due to the forwarded signal 17 which leads to a closing of the pressure switch 13a, a positive response to the query regarding seat occupancy takes place and the seat occupancy detection signal is forwarded by means of the closed control current circuit to a control unit (not shown in any greater detail), so that the control unit can further process this detected seat occupancy detection for further use.

Figure 3:
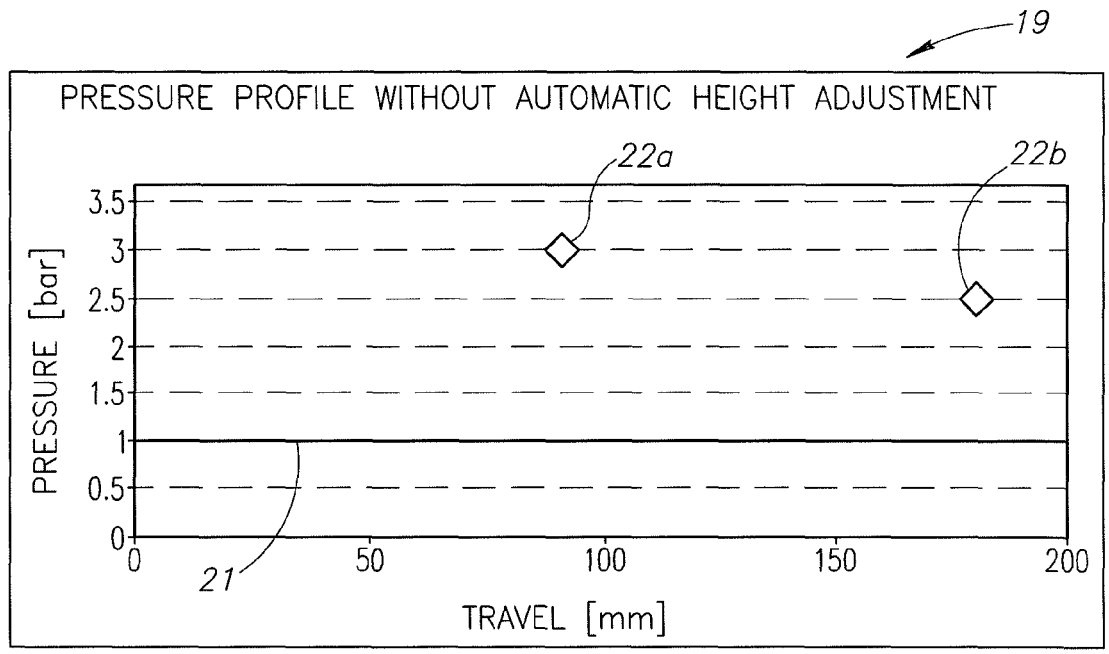
FIG. 3 shows, in a diagram, the pressure/travel profile in the case of seat occupancy without any previously performed setting of the pretensioned spring pressure.
Figure 4:
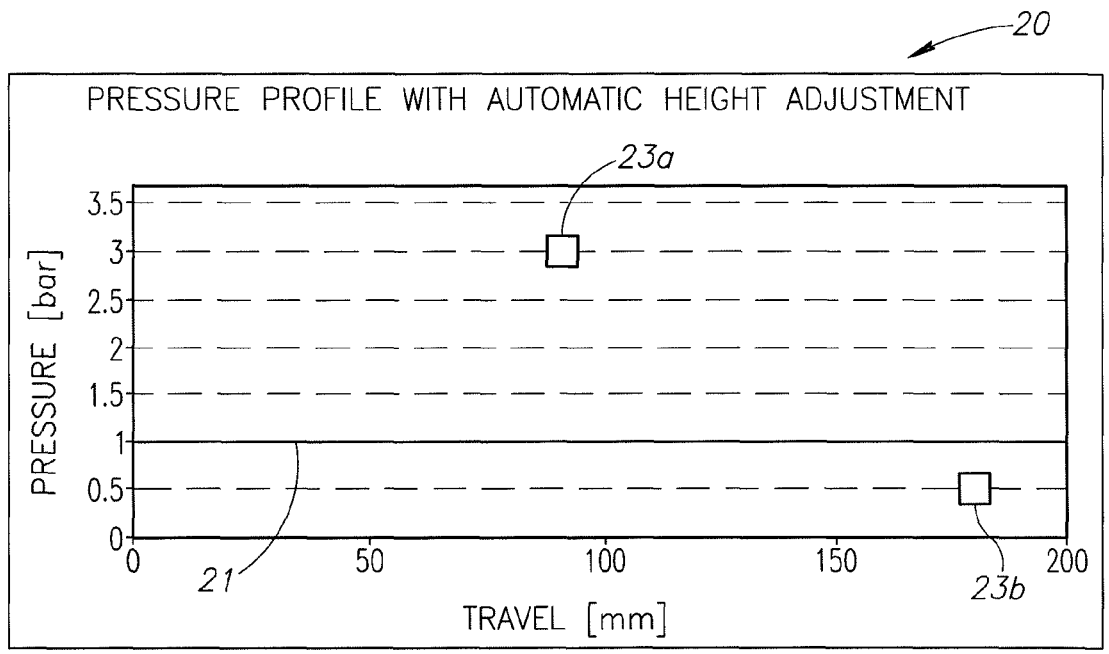
FIG. 4 shows, in a diagram, the pressure/travel profile in the case of seat occupancy with a previously performed setting of the pretensioned spring pressure.

FIG. 3 shows, in a pressure/travel diagram, the profile within the gas spring in the case of a seat occupancy detection taking place without any previously performed setting of the pretensioned spring force or pretensioned spring pressure, and FIG. 4 shows the pressure profile in the case of a seat occupancy detection taking place with a previously performed setting of the pretensioned spring force or pretensioned spring pressure.

As show in FIG. 3, at a value of 1 bar, a pressure threshold value 21 is set at which the pressure sensor and the pressure switch are activated and detect a transition from the upper range to the range below the pressure threshold value or vice versa.

The pressure/travel diagram 19 shown in FIG. 3 shows the pressure prevailing in the gas spring as a function of the excursion travel of the gas spring when a transition is taking place from an unoccupied state to an occupied state of the seat. In the unoccupied state, the spring has an excursion of approximately 180 mm and a pressure of, for example, 2.5 bar prevails in the gas spring as shown at measurement point 22b. In the occupied state, the pressure within the gas spring is 3 bar and the spring has undergone an excursion travel of approximately 80 mm, as shown at measurement point 22a. As shown in the diagram in FIG. 3 that, due to the pressure force prevailing from a previous seat occupancy as shown at measurement point 22b in the unoccupied state of the seat, only a small pressure difference takes place during the transition from the measurement point 22b to the measurement point 22a, which difference can be detected only with difficulty and therefore it is impossible to state with certainty whether a seat occupancy by a predefined minimum weight has taken place.

By contrast, the diagram 20 shown in FIG. 4 illustrates the pressure profile according to the present invention in the case of a transition from an unoccupied state to an occupied state of the seat. The unoccupied state at measurement point 23b with an excursion travel of approximately 180 mm and a pressure of approximately 0.5 bar lies below the pressure threshold value 21. In the procedure according to the invention, such a preset pretensioned spring force or such a preset spring pressure as shown at point 23b is deliberately set below the pressure threshold value 21, as may take place for example by means of the height control unit already described and the detection element which interacts therewith and also the supply and discharge control element. After the pretensioned spring pressure as shown at 23b has been set below the pressure threshold value 21, a seat occupancy takes place, whereupon the pressure as shown at point 23a rises to 3 bar with a spring excursion of approximately 80 mm. As shown from this diagram, in this case there is an exceeding of the pressure threshold value 21 at which a detection takes place by means of the pressure sensor, and the control current circuit shown in FIG. 2 is closed by means of the pressure switch so as to forward a control signal which indicates that a seat is being occupied by a minimum weight.

Advantageously, the pressure threshold value 21 is at a level which is at or slightly below the region of the weight force caused by the predefinable minimum weight of the person intended to occupy the seat, so that an exceeding of the pressure threshold value 21 during a transition from point 23b to point 23a is always ensured as a result of the seat being occupied by a person having at least the minimum weight.

While the preferred embodiment of the invention has been illustrated and described, as noted above, many changes can be made without departing from the spirit and scope of the invention. For example, alternative predefinable threshold values may be used within the parameters of the present invention while maintaining the advantages described above. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A vehicle seat having a device for vehicle seat occupancy detection, comprising:
    a base frame arranged between a seat part of the vehicle seat and a vehicle body part and configured for adjustment in the height direction of the vehicle seat, the base frame having at least two scissors arms connected to one another;
    at least one gas spring configured to adjust the vehicle seat in the height direction;
    a pressure sensor connected to the gas spring, wherein the pressure sensor is configured to detect an exceeding of a predefinable pressure threshold value upon a transition of the vehicle seat from an unoccupied state to a state occupied by a minimum weight due to a change in pressure within the gas spring brought about as a result of the transition;
    a supply and discharge control element configured to set a pretensioned spring pressure within the gas spring below the pressure threshold value in an unoccupied state of the vehicle seat; and
    a height control unit,
    wherein the supply and discharge control element is configured to supply or discharge gas to or from the gas spring using the height control unit in order to set the pretensioned spring pressure below the pressure threshold value as a function of the detected height position,
    wherein the pressure threshold value corresponds at most to the downward-acting weight pressure due to the minimum weight and counteracts the minimum weight.

2. The vehicle seat according to claim 1, further comprising:
    a detector connected to the height control unit and attached to at least one of the scissors arms, the detector configured to detect the current height position of the scissors arm.

3. The vehicle seat according to claim 1, wherein the pressure sensor further comprises a control current circuit for controlling a seat occupancy detection signal, the control current circuit having at least one pressure switch connected to the pressure sensor.

4. The vehicle seat according to claim 1, further comprising a time control unit for setting a predefinable time duration over which the pretensioned spring pressure below the pressure threshold value must exist in order to activate the vehicle seat occupancy detection.

* * * * *